Jan. 29, 1963 H. L. BLASBALG 3,076,144
VOLTAGE COMPARATOR OF STORED SAMPLES OF PLURAL MODULATED
PULSES AND CONTROLLING THRESHOLD GATE
Filed Jan. 14, 1959 14 Sheets-Sheet 1

Fig-1

INVENTOR.
HERMAN L. BLASBALG
BY
S. A. Strickler
ATTORNEYS

INVENTOR.
HERMAN L. BLASBALG
BY
S.A. Strickett
ATTORNEYS

Fig-7

United States Patent Office 3,076,144
Patented Jan. 29, 1963

3,076,144
VOLTAGE COMPARATOR OF STORED SAMPLES OF PLURAL MODULATED PULSES AND CONTROLLING THRESHOLD GATE
Herman L. Blasbalg, Baltimore, Md., assignor to the United States of America as represented by the Secretary of the Air Force
Filed Jan. 14, 1959, Ser. No. 786,900
5 Claims. (Cl. 328—147)

This invention relates to a statistical analyzer and particularly to an analyzer for determining the presence or absence of modulation on a radiated signal.

The first step of electronic counter measures consists in determining the kind, position and characteristics of the various radiated energy from the enemy electronic devices. It is, accordingly, customary to send "ferret" vehicles to "finger print" the electronic devices providing radiation. One of the characteristics to be determined is the presence or absence of modulation on the detected radiation wave.

The present invention relates to an electronic system for testing at predetermined sequences the envelopes of the detected radiation wave by taking samples at preselected time positions along the envelope of the wave and alternately supplying the samples to a pair of storage devices. The stored samples are then fed to a pair of potential generating devices to provide electrical quantities proportional to the width of the envelope at the sampling positions. A sum and difference device is then utilized to provide the sum and difference of the quantities which are then compared to control a yes or no gate to signal the presence or absence of modulation on the investigated wave.

In a construction according to the invention a first and second generator receive alternate envelope samples and provide the output thereof to a difference amplifier and to an adder device after which the sum and the difference are applied to a comparator which controls the operation of a gate tube to control a blocking oscillator and supply yes or no signals to a suitable recorder.

It is, accordingly, an object of the invention to provide an improved modulation detector.

It is a further object of the invention to provide a small-sized lightweight analyzer for determining the presence or absence of modulation on a detected wave.

Other objects and advantages of the invention will be apparent from the following detailed descriptions taken in conjunction with the accompanying drawing, in which:

FIG. 6 is a block diagram of a modification according to the invention;

FIG. 9 is a simplified showing of a section of the modification according to FIG. 6;

Figure 1:
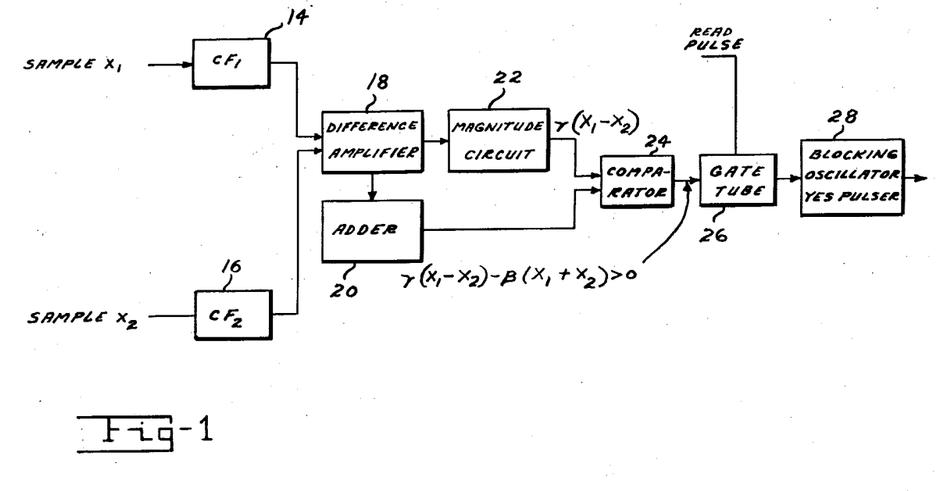
FIG. 1 is a block diagram of a statistical analyzer according to the invention.
Figure 2:
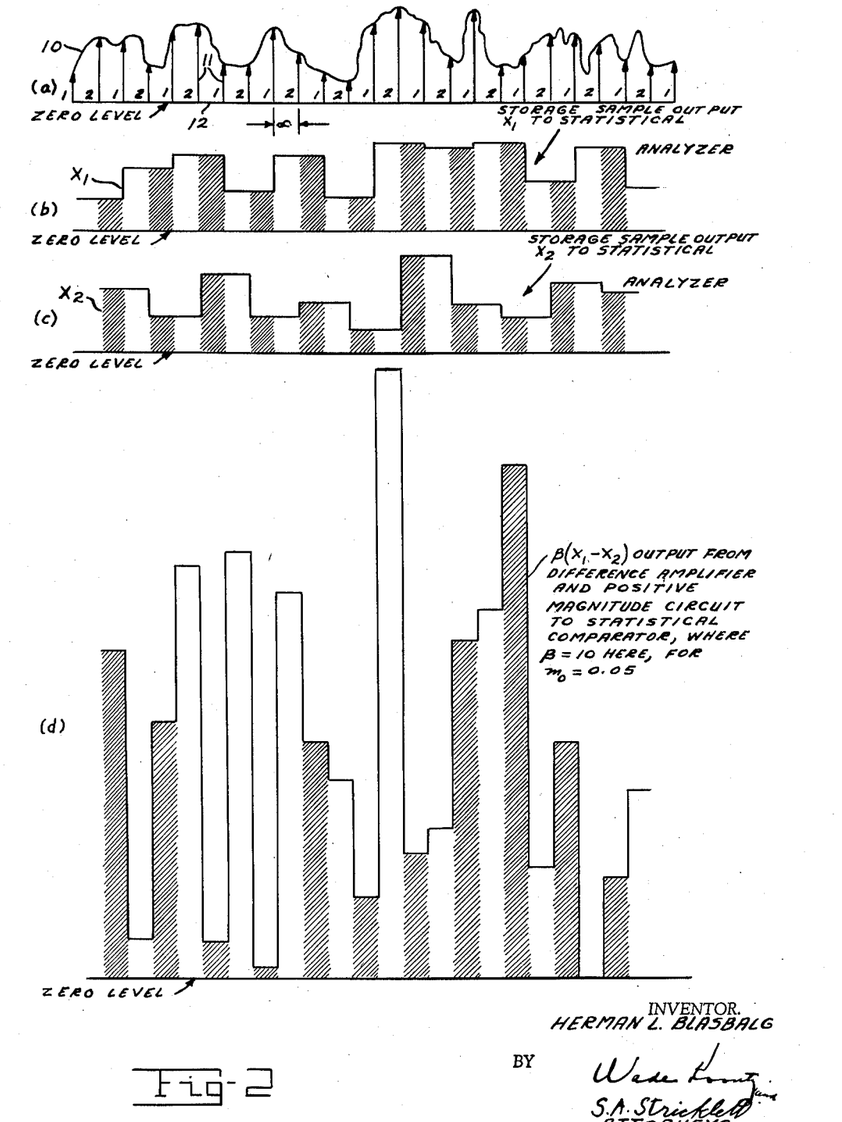
FIG. 2 is a graphical presentation of the signals through the analyzer.
Figure 3:
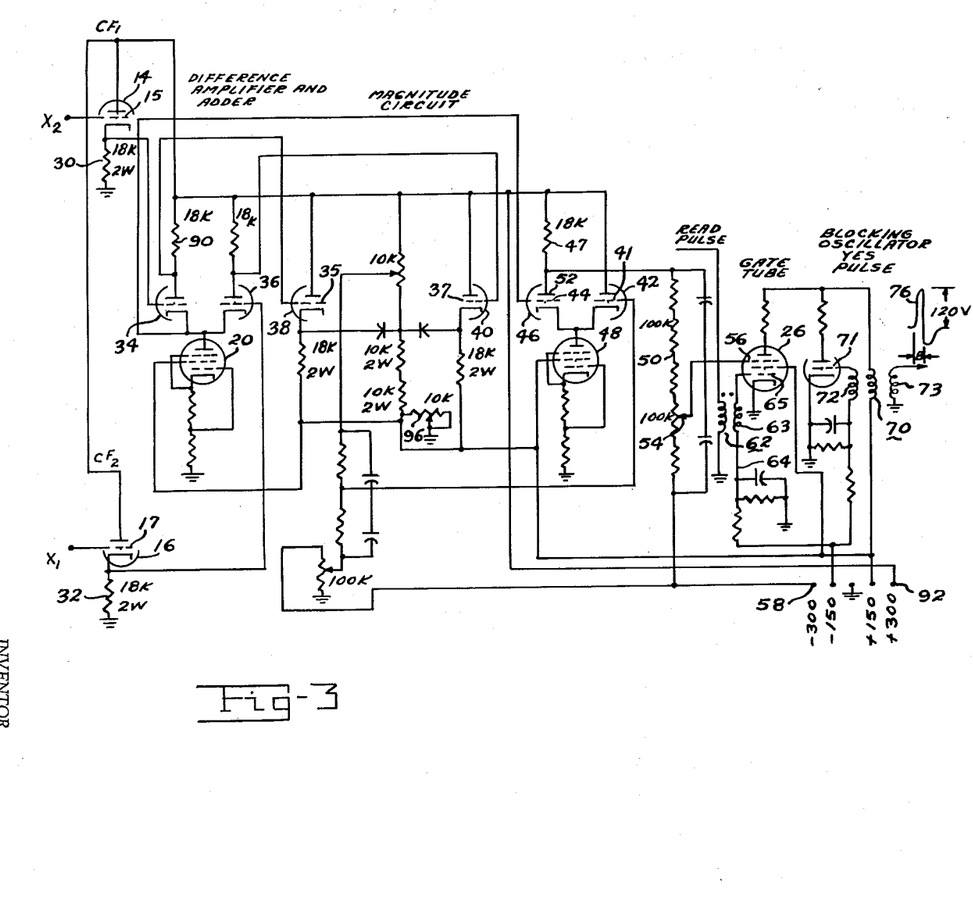
FIG. 3 is a schematic circuit diagram of the analyzer of FIG. 1.

In an exemplary embodiment according to the invention the detected wave as received from any suitable detecting device is periodically sampled by measuring the amplitude of the envelope 10 of the detected wave, as shown in FIGURE 2a, at suitable time positions such as $\alpha$ indicated by the numerals 1 and 2 applied between the indicators 11 between the envelope 10 and the zero base lever 12 in FIGURE 2a. The samples $X_1$ and $X_2$ are alternately supplied to suitable sample storing devices such as capacitors and the respective samples $X_1$ and $X_2$ FIGURES 2b and 2c are periodically read out to a first potential generator 14 and a second potential generator 16 as shown in FIGS. 1 and 3. The generators 14 and 16 control a difference amplifier 18 which in turn feeds an adder 20. The output of the difference amplifier is also supplied through a magnitude control circuit 22 after which the output FIGURE 2d of the magnitude control circuit and of the adder 20 FIGURE 2e are applied to a comparator 24 which in turn supplies a control potential FIGURE 2f to a gate tube 26 to which periodic read pulses 60 FIGURE 2g are also supplied. The output FIGURE 2h of the gate tube provides yes pulses and controls a blocking oscillator 28 when the comparator 24 indicates modulation of the investigated wave.

The potential generators 14 and 16 are preferably grid controlled tubes having the grids 15 and 17, as shown in FIGURE 3, controlled by the quantities $X_1$ and $X_2$ respectively representing the height of the envelope 10 at the sample times. The grid controlled generators 14 and 16 have equal load resistors 30 and 32 in the cathode to ground circuit so that the output is proportional to the grid supply $X_1$ or $X_2$.

The difference amplifier 18 is constituted by a pair of amplifiers 34 and 36 being respectively controlled from the tubes 14 and 16. The potential of the plates of the amplifiers 34 and 36 are in turn applied to the grids 35 and 37 of tubes 38 and 40 to control the amplitude of the output signal to the grid 41 of tube 42. The potential across the adder pentode tube 20 is applied to the grid 44 of tube 46 having a load resistor 47 in the plate circuit. Tubes 42 and 46 supply current through pentode 48 to provide a potential from the plate 52 of tube 46 across a potentiometer 50 connected between the plate 52 of tube 46 and a source 58 of bias potential herein indicated as −300 volts. An intermediate tap 54 on the potentiometer 50 picks off a control potential which is supplied to the grid 56 of gate tube 26. A read pulse 60 lagging behind the output of the generators 14 and 16 by a time interval $\alpha$ of 35 $\mu$seconds so that the read out will not be disturbed by any transient in the signal caused by switching operations is applied through a control transformer 62, the secondary 63 of which is in the biasing line 64 to the grid 65 of gate tube 26 so that the read pulse provides a positive pulse on the transformer secondary 63 to drive the control grid 65 of the gate tube 26 positive so that the application of a positive potential to the grid 56 will cause current flow through gate tube 26 and the transformer 70 which initiates a pulse in secondary 72 to grid 71 to initiate blocking oscillating action in tube 72 and secondary 74 supplies an output signal 76 to any suitable indicating device.

In the operation of this simplified form of the invention the storage samplers alternately sequentially sample the envelope 10 of the detected wave and the alternate samples $X_1$ and $X_2$ are held on suitable storage devices such as condensers (not shown) for a time duration equal to twice the sampling period $\alpha$. The period $\alpha$ between samples may be varied as desired from 500 μseconds to 125 μseconds. This condition is indicated at FIG. 2a by the amplitude signals 1 and 2 as indicated above.

The input samples $X_1$ and $X_2$ control the generators 14 and 16 which provide potentials proportional to the samples $X_1$ and $X_2$ which proceed through their respective amplifiers 36 and 34 of the difference and sum amplifier device. The difference and sum outputs are proportional to $(X_1-X_2)$ and $(X_1+X_2)$ respectively, these are then applied to comparator 24 as shown at FIGS. 2d and 2e. FIG. 2d showing $\beta(X_1-X_2)$ output from the difference amplifier and the positive magnitude circuit to the statistical comparator 24, where $\beta$ is the voltage gain of the difference amplifier 28 and magnitude circuit 22. FIG. 2e shows $\gamma(X_1+X_2)$ output from the addition amplifier to the statistical comparator where the $\gamma$ is the voltage gain of the addition circuit. The output of the comparator 24 is equal to $\beta(X_1-X_2)-\gamma(X_1+X_2)$ as shown at 28.

The read pulse 60 is applied to grid 65, 35 μseconds after the initiation of conduction in the tubes 14 and 16 by the samples $X_1$ and $X_2$. Whenever the output of the comparator 24 is in excess of the preset cutoff threshold bias level 78, FIGURE 2f, of the grid 56 of the gate tube 26 the read pulse will actuate the gate 26. This in turn triggers the blocking oscillator and provides the yes pulse 76. The yes indication, in the form of a pulse 76, is stored in any suitable indicator or counter.

Output of difference and positive
$$\text{magnitude circuitry} \sim (X_1-X_2)$$

Gain through amplifier and difference system $=\beta$

Input to comparator from difference
$$\text{circuitry} = \beta(X_1-X_2)$$

Output of adder $\sim (X_1+X_2)$

Gain through amplifier and adder system $=\gamma$

Input to comparator from addition circuitry $=\gamma(X_1+X_2)$

Output of comparator: $\beta(X_1-X_2)-\gamma(X_1+X_2)$ $$\frac{\beta}{\gamma}(X_1-X_2)-(X_1+X_2)$$

Gain of comparator $=\Delta$

Input to gate tube $=\Delta\left(\frac{\beta}{\gamma}(X_1-X_2)-(X_1+X_2)\right)$ If $$\Delta\left(\frac{\beta}{\gamma}(X_1-X_2)-(X_1+X_2)\right) > \epsilon$$

there will be a "Yes" indication at the counter. $\epsilon$ is the threshold level that is necessary to obtain hold-off conditions as a safeguard against false noise triggering indications.

Note that the higher the comparator gain $\Delta$, the lower the threshold error $\epsilon/\Delta$. Physically $\epsilon/\Delta$ can never be zero. This is characteristic of all threshold devices.

The simplified circuit of FIGS. 1–3 is very compact and can be mounted in a minimum of space. However this circuit has three undesirable characteristics.

(1) In order to limit the number of tubes, the difference amplifier must be operated at its maximum gain.

(2) Extreme linearity is required in the addition and subtraction operation since these occur prior to comparison.

(3) Drift is a serious problem.

Because the difference amplifier 18 is operated at maximum gain, the grid 84 to cathode bias is about −0.85 at a reference level of 100 v. at the grids 84. This operating point is necessary for maximum gain, $g_m$. The constant current pentode 20 in the cathode 86 of the difference amplifier allows for a maximum difference of 1.7 volts between the grids at the 100 v. reference level, see FIG. 4. This difference is diminished if the reference is raised above 100 v., and increased if the reference is lowered below 100 v.

Figure 4:
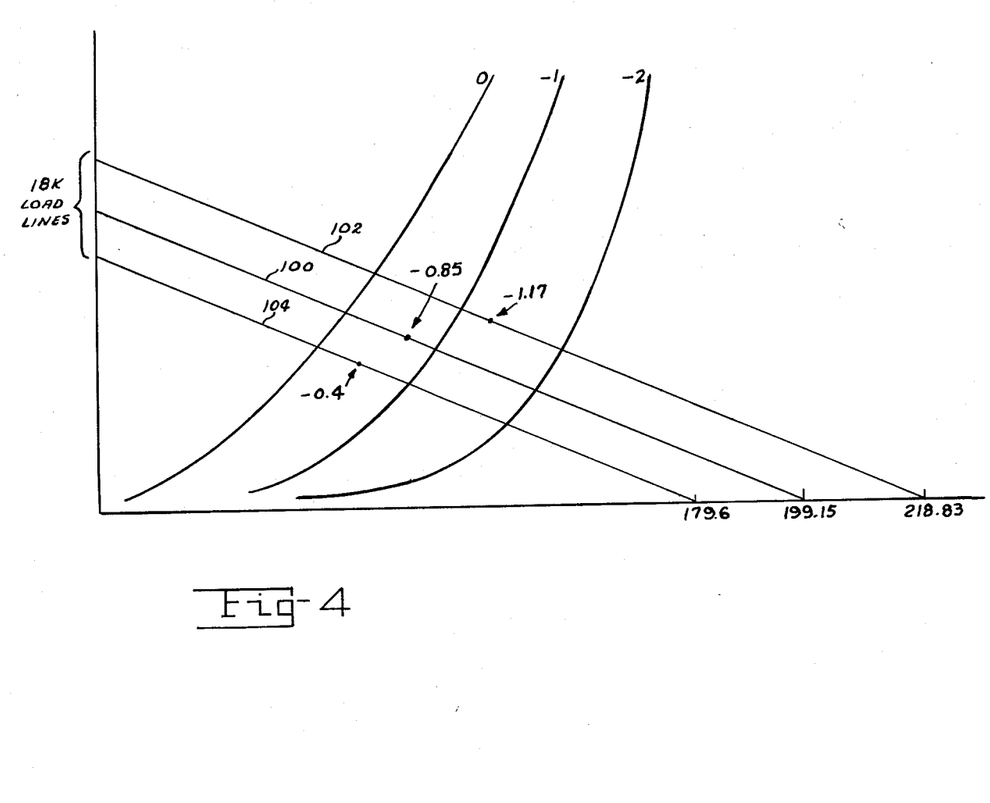
FIG. 4 is a graphical presentation of the characteristics of the difference amplifier under various load conditions.
Figure 5:
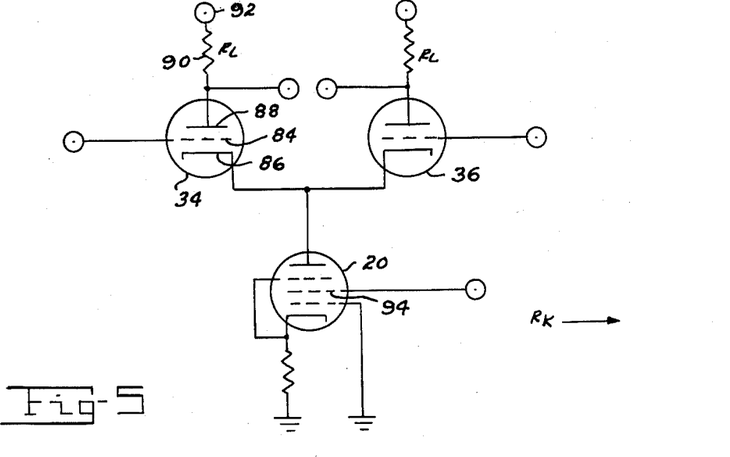
FIG. 5 is a simplified circuit diagram of the difference amplifier.
Figure 7:
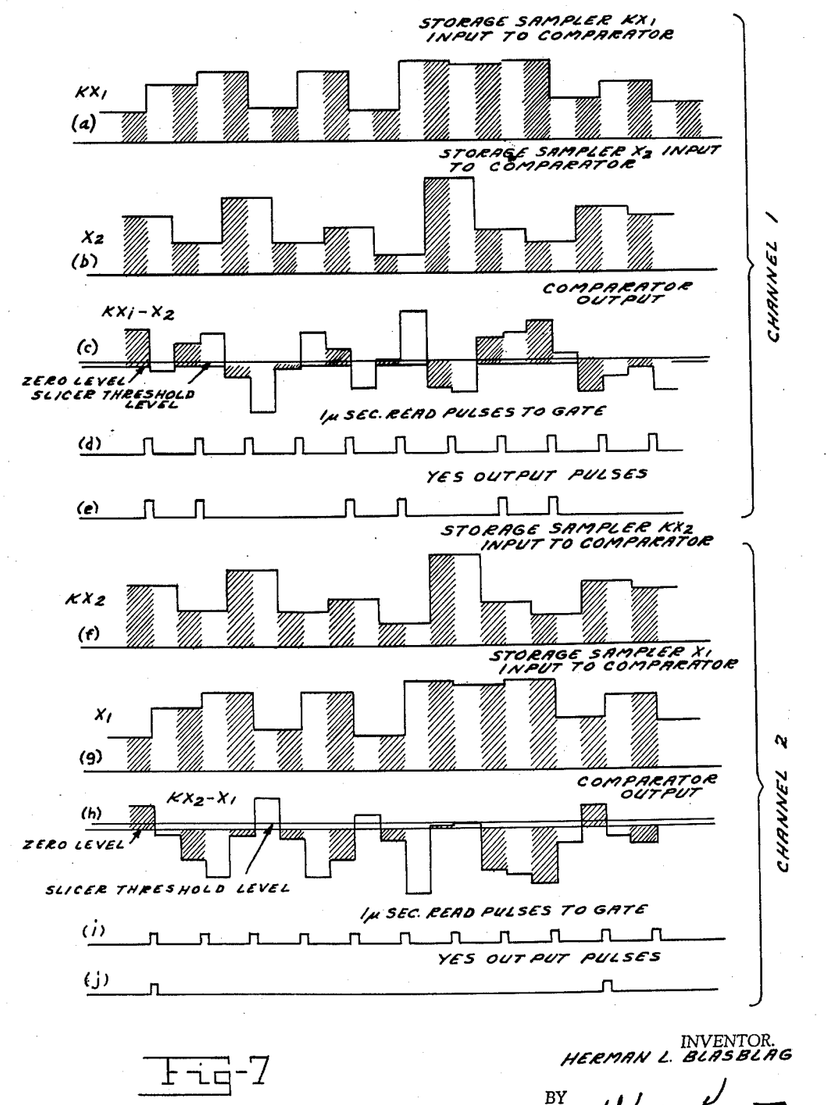
FIG. 7 is a graphical illustration of the signals through the modification according to FIG. 6.

The foregoing can be seen from FIGS. 4 and 5 and from the following derivation:

Where each amplifier 34 and 36 is provided with a load resistor 90 of 18K value in series between applied voltage $E_{bb}$ of 300 v. at terminal 92 and plate 88 and where the drop across pentode 20 of 100.85 v. with grid reference at grid 94 of 100 v. as determined by the setting of control resistor 96 (curve 100); $E_b$ at pentode 20 is 100.85 v. and $E_{gk}$ is −0.85 v. When the grid reference is reduced to 80 v. (curve 102) $E_b$ is reduced to 81–17 v. and $E_{gk}$ raised to −1.17 v. Also when the grid reference is raised to 120 v. (curve 104) $E_b$ increases to 120.4 v. and $E_{gk}$ falls to −0.4 v.

It can be seen that when a 1.7 volt difference is applied between grids, the voltage across the difference amplifier 18 is reduced by 0.85 volt at the cathode end. Hence, the grid to cathode voltage goes to zero and saturation results. Saturation causes nonlinear operation at the sum and difference outputs. Thus, the mathematical characteristics of the circuit are no longer valid. Hence, the foregoing discussion implies low level operation.

Figure 8:
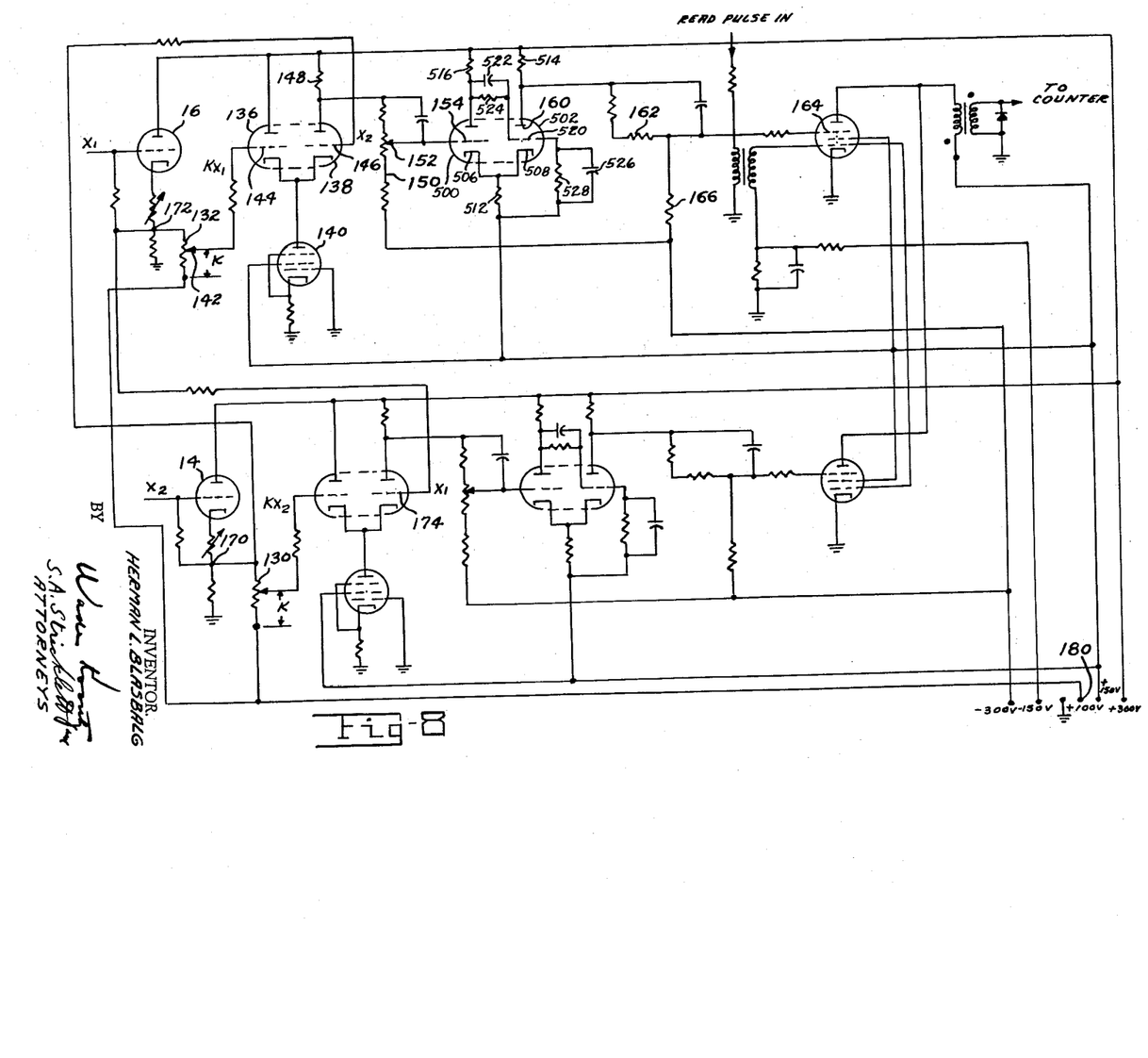
FIG. 8 is a schematic circuit diagram of the modification according to FIG. 6.

In order to eliminate the necessity for low level operation, the circuit was modified as shown in FIGS. 6 and 8 to provide a pair of amplitude comparators 110—112 with the comparators being amplitude differential amplifiers. Each of the amplifiers 110 and 112 feeds a level slicer 114 or 116 each of which in turn feeds a gate 118 or 120. Since the amplitude comparators are differential amplifiers there is no need for linearity as the output is either positive or negative. A positive output from either comparator 110 or 112 actuates the respective slicer 114 or 116.

Figure 10:
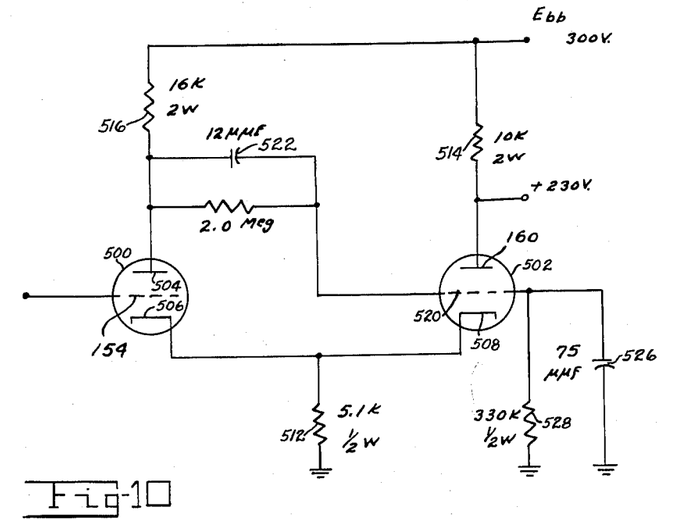
FIG. 10 is a simplified showing of the slicer of FIG. 6.

As shown in FIG. 10, the slicers 114 and 116 each consists of a pair of discharge paths 500 and 502. The path 500 having a plate 504, a cathode 506 with control grid 154, while path 502 has a plate 160, a cathode 508 and control grid 510. Cathodes 506 and 508 are grounded through common cathode resistor 512. Plate 160 is supplied from a 300 volt source through plate resistor 514 and plate 504 is supplied from the 300 volt source over resistor 516. Grid 520 is connected to plate 504 by way of capacitor 522 and parallel resistor 524 and in turn is connected across cathode resistor 512 by capacitor 526 with discharge resistor 528 in parallel.

As shown in FIGS. 8 and 9 the cathodes of tubes 14 and 16 are connected over potentiometers 130 and 132 of 10K to a positive bias of 100 v. The amplitude comparators 110 and 112 each consist of a pair of discharge paths 136 and 138 with the cathodes feeding through a pentode 140 to ground. An intermediate point 142 in the potentiometer 132 providing a factor $KX_1$ is directly connected to the grid 144 of the path 136 of the directly following comparator 110 or 112. The respective cathodes of tubes 14 and 16 are cross connected to the grids 146 of the alternate path 138. The path 138 has a load resistor 148 in the cathode lead. The plate of path 138 is connected over potentiometer 150 to a bias of −300 v. with a mid tap 152 connected to control grid 154 of respective slicer 114 or 116. Plate 160 of the slicer is connected over resistor 162 to grid 164 of the gate. Negative bias is normally applied to grid 164 over resistor 166.

The design of the simple resistance network, as shown in FIG. 9, is such that there is no possibility of both signals operating simultaneously and thereby permitting false indications.

Theory of Operation

For $$X_1 > X_2$$

$$\frac{X_1 - X_2}{X_1 + X_2} \geq m_0$$

$$\therefore X_1 - X_2 \geq m_0(X_1 + X_2)$$

$$\therefore (1 - m_0) - X_2(1 + m_0) \geq 0$$

$$\therefore X_1 \frac{1 - m_0}{1 + m_0} - X_2 \geq 0$$

or $$KX_1 - X_2 \geq 0$$

where $$K = \frac{1 - m_0}{1 + m_0}$$

similarly for $$X_2 > X_1$$

$$\frac{X_2 - X_1}{X_1 + X_2} \geq m_0$$

and $$KX_2 - X_1 \geq 0$$

where $$K = \frac{1 - m_0}{1 + m_0}$$

The ratio $$K = \frac{1 - m_0}{1 + m_0}$$

is obtained at the outputs of the amplifiers by means of the two potentiometers 130 and 132. Terminals 170—172 of these potentiometers are connected to the respective amplifiers as shown in FIG. 9 and terminals 142 to reference voltage $E_0 = 100$ v.

The center tap of each potentiometer is connected to the grid of its respective comparator. Terminals 170 and 172 of the potentiometers 130 and 132 are criss-crossed to provide the physical circuitry representing the functions $KX_1 - X_2$ and $KX_2 - X_1$. Terminal 172 of channel $X_1$ is connected to grid 174 of channel $X_2$, and terminal 170 of channel $X_2$ is connected to grid 146 of channel $X_1$. K is obtained by moving the center tap 142 up and down where $$K = \frac{KR}{R}$$

See FIG. 9.

The slicers in each channel have a resolution of the order of a fraction of 1 volt, and the outputs of each is 50 v. or more. The input level to the input grids 154 of the slicers is adjusted to 165.3 v. or 1 v. below the triggering level of 166.3 v.

The operating characteristics of these slicers is tabulated below:

| $E_f$ Trigger | 5.7 v., R.M.S. 60~ | 6.3 v., R.M.S. 60~ | 6.9 v., R.M.S. 60~ | Output Step | $E_{bb}$ |
|---|---|---|---|---|---|
| | V. | V. | V. | V. | V. |
| On | 15.0 | 15.0 | 15.0 | +35 | 140 |
| Off | 14.7 | 14.7 | 14.7 | −35 | |
| On | 16.3 | 16.3 | 16.3 | +35 | 150 |
| Off | 15.9 | 15.9 | 15.9 | −35 | |
| On | 17.2 | 17.2 | 17.2 | +38 | 160 |
| Off | 16.9 | 16.9 | 16.9 | −38 | |
| On | 35.0 | 35.0 | 35.0 | +60 | 300 |
| Off | 34.5 | 34.5 | 34.5 | −60 | |

The pentodes 140 in the cathodes of the comparators are constant current generators. Therefore, as long as the input grids 144 of each comparator are at the same voltage level, this level can be increased as much as 50 volts above the 100 volt reference, and the comparator output level will remain constant within ±2 volts about 241 volts. This necessitated an adjustment of the 162 v. level for each particular value of signal modulation M.

The preceding discussion of the system design shows that the slicers are actuated with either $KX_1 \geq X_2$ or $KX_2 \geq X_1$. The slicer is an on-off device. Since there is a 1 v. differential biasing threshold at the grids of the slicers, they will be actuated when either $$KX_1 \geq X_2 + \frac{1}{G} \text{ (Referred to the grids of}$$

$$KX_2 X_1 + \frac{1}{G} \text{ the respective comparator.)}$$

Since $G \geq 20$, either $KX_1 \geq X_2 + 50$ mv. or $KX_2 \geq X_1 + 50$ mv. is necessary condition for triggering.

High precision power supplies are necessary in order to maintain critical voltage levels. This is inherent in all statistical analyzers since the results are often critically a function of the threshold setting.

During the operation of the Statistical Analyzer, it was found that the B+ and B− voltages had to be very carefully monitored and corrected for drift in order to obtain reproducible results.

Figure 11:
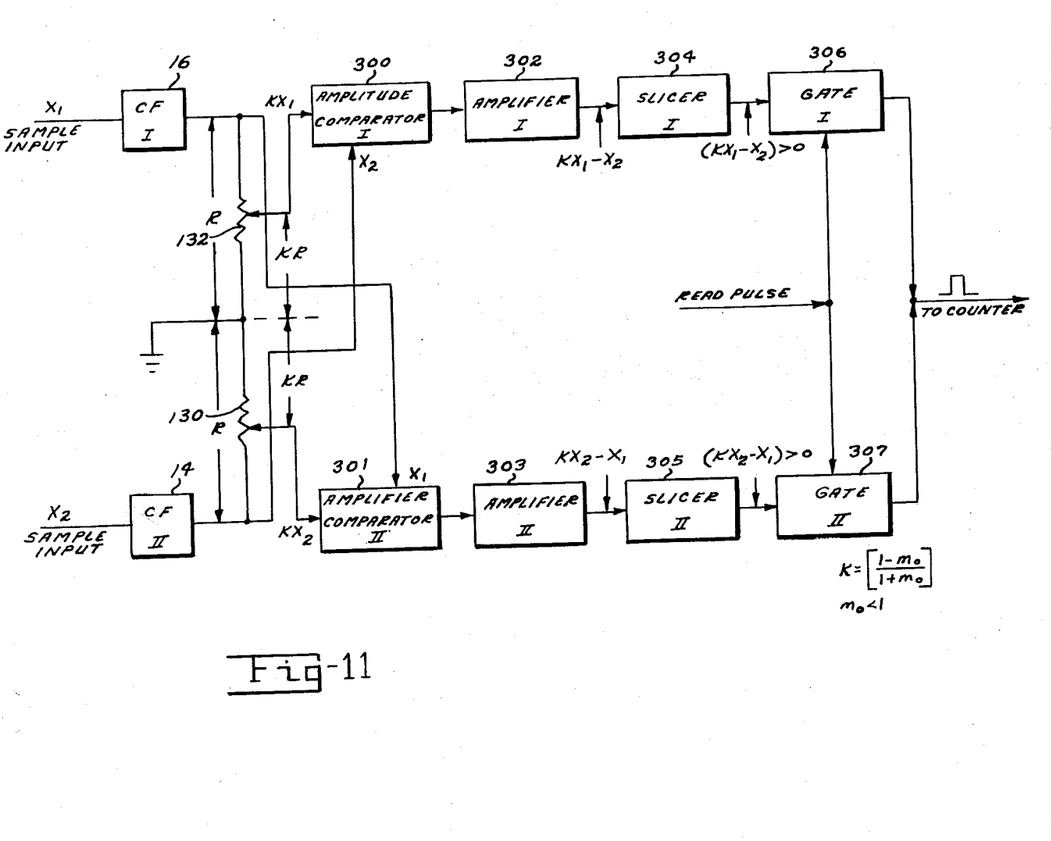
FIG. 11 is a block diagram of a further modification according to the invention.
Figure 12:
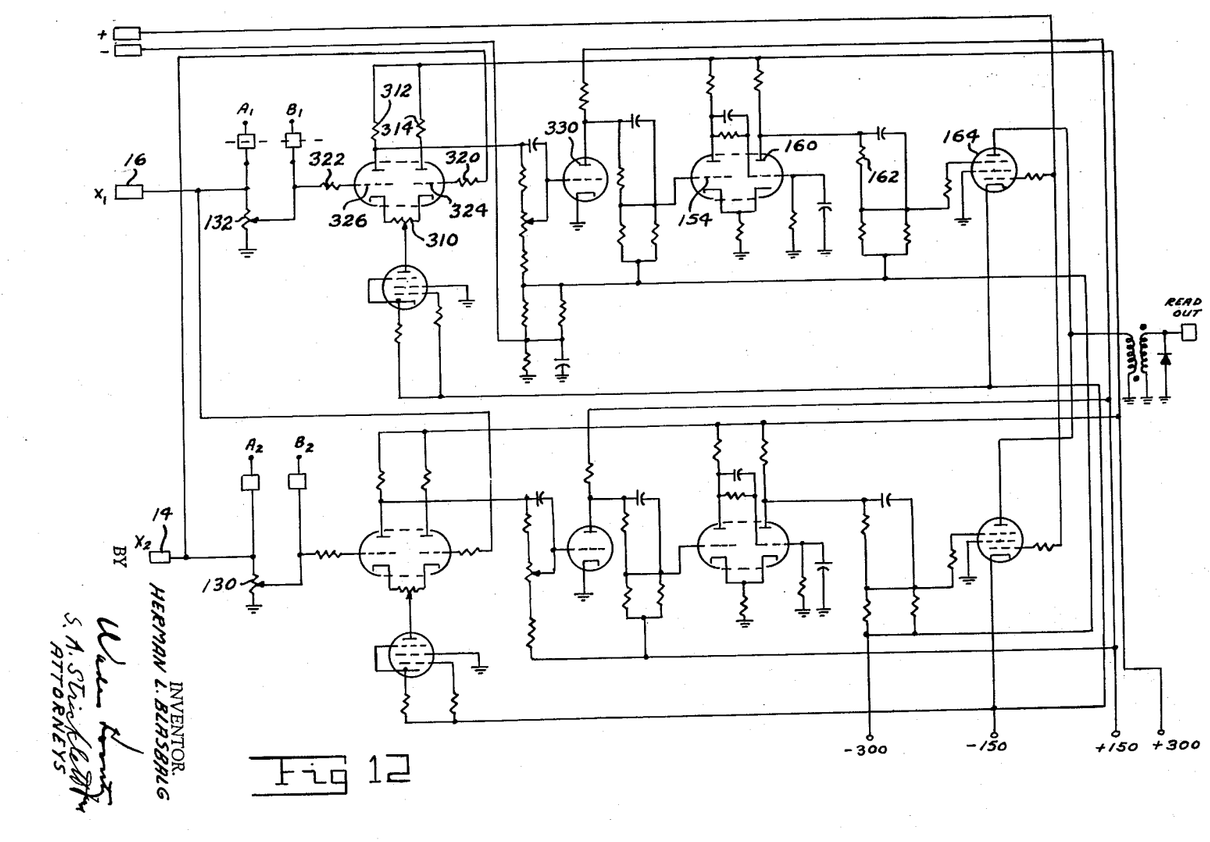
FIG. 12 is a schematic circuit diagram of the modification according to FIG. 11.

The circuit was further modified to reduce drift, secure plate stability of the comparators and improve the operation as shown in FIGS. 10, 11 and 12.

The weighting potentiometers 130 and 132 have been directly grounded eliminating the +100 v. biasing potential.

The slicers have been grounded eliminating the +150 biasing.

Plate stability in the amplitude comparators has been improved by inserting an equalizing potentiometer 310 between the cathodes of the comparator and by inserting load resistors 312 and 314 in the plate circuits. Because of the load resistors and since all points on the comparators are referred to ground it was found desirable to insert 100 ohm resistors 320 and 322 in series with the grids 324 and 326 to suppress parasitic amplifier oscillations in the comparators. The analyzer channel comparator gains have been increased slightly by the insertion of an additional amplifier stage 330 in each channel, in order to compensate for the loss or gain by the insertion of the plate load resistors 312 and 314.

Figure 13:
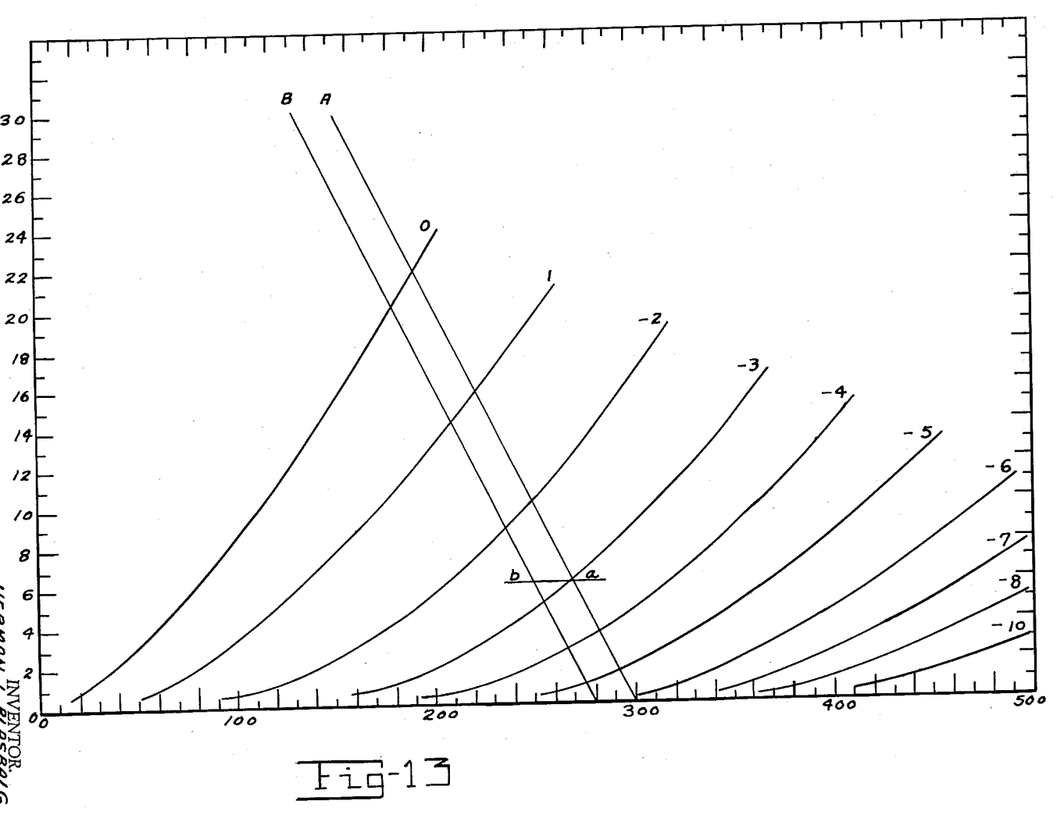
FIG. 13 is a graphical presentation of the operation of the comparator according to FIG. 11.

Furthermore, the comparator operation of the modified analyzer has now been improved in three ways, see FIG. 12;

(i) The grid reference can be raised +20 v. above ground without changing the plate output voltage by as much as 1 mv.
(ii) The frequency response of the comparator has been increased to over 30 mc. due to the 5.1K loading in the plates.
(iii) The tolerable range of difference of potential between the grids of the comparator has been increased to 4.5 volts. This is due to two changes in the circuitry;
    (a) the grid potential zero reference is now at ground,
    (b) the 5.1K loading of the plates (see FIG. 13).

The improved stability of plate potential with variation of grid reference of the comparators is due to the potentiometers 310 in the cathodes and the 5.1K loading of the plates. These potentiometers have four functions:

(a) They compensate for that 5% tolerance of the plate load resistors,
(b) They compensate for the lateral position difference of the grid bias curves between each section of the double triode,
(c) They tend to equalize the $r_p$ slope of each tube section,
(d) They compensate for the slight increase in current through the constant current pentode due to increase in plate voltage.

Figure 14:
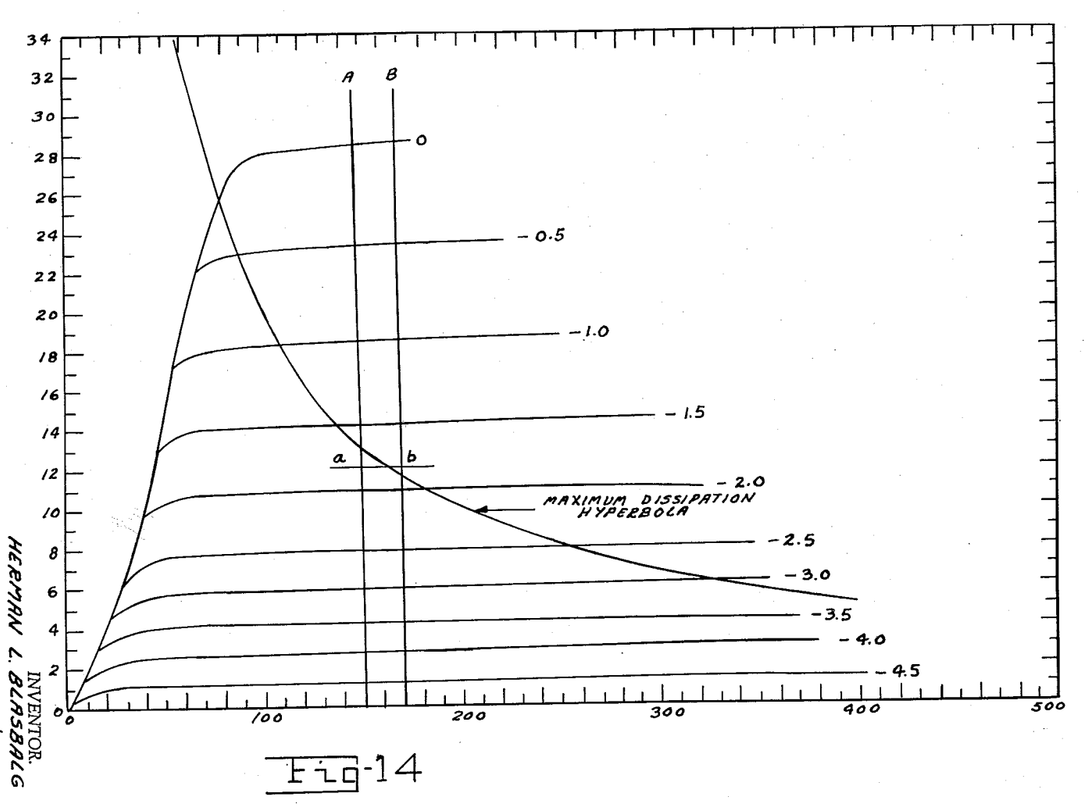
FIG. 14 is a graphical presentation of the comparator cathode impedance operation.
Figure 15:
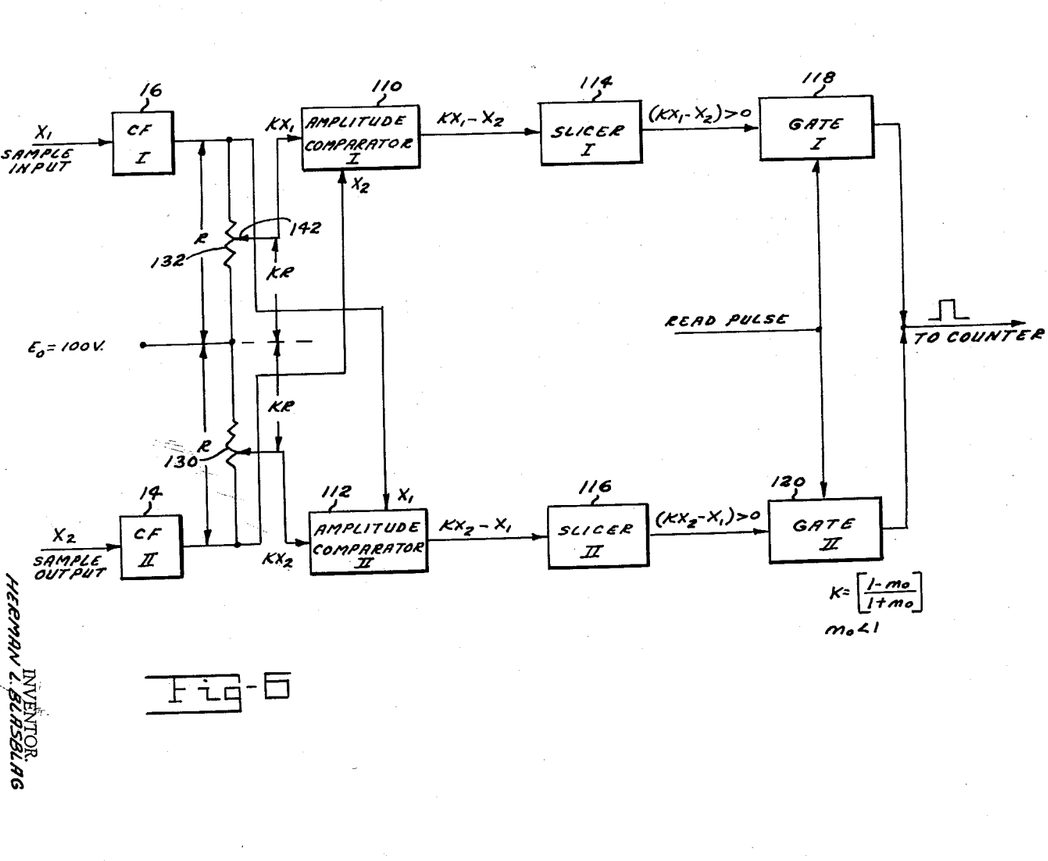
Figure 16:
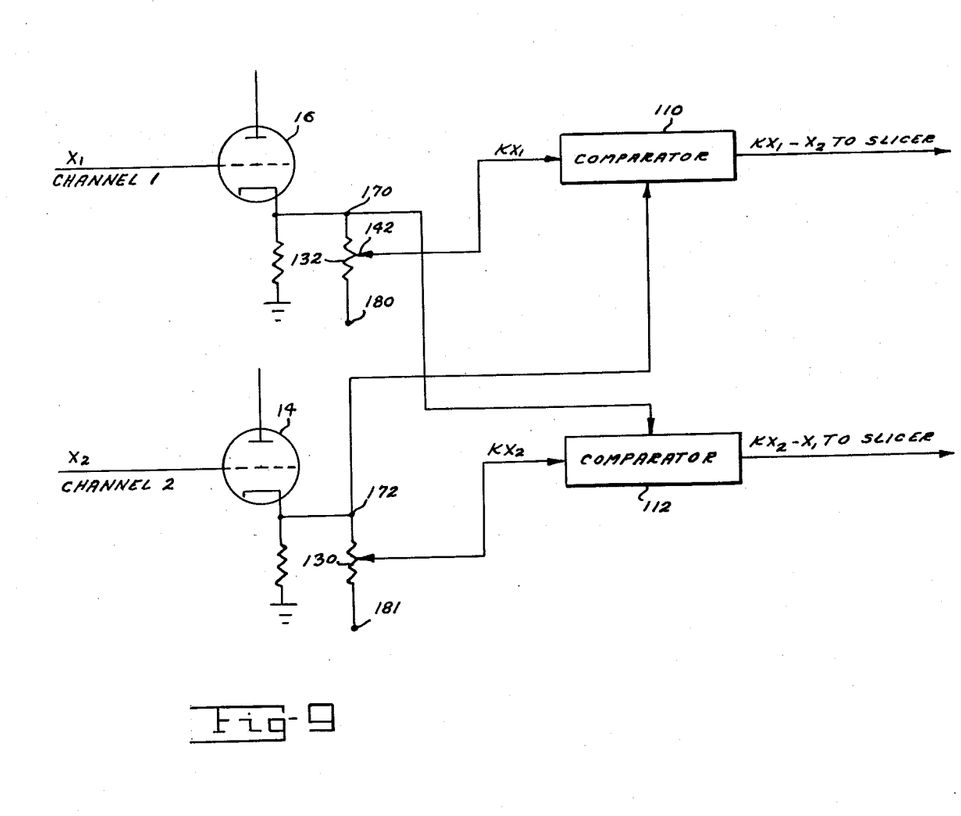

The grid reference level of the comparators should not ordinarily be raised above 20 v. the reason being that the constant current pentode behaves as a perfect adder. A grid reference increase of 20 v. at the comparator grids is reflected as a corresponding increase at the plate of the pentode. This increase is shown in FIG. 14 where load line A of 110 is shifted to position B, 20 v. to the right of A, and quiescent operating point or to position B. Quiescent operating point B is just over the maximum dissipation of the tube. On the other hand, a grid reference level increase of 50 v. above ground will cause a 50 mv. shift in the output plate potential. The equalizing potentiometers 310 of the comparators have been kept to a minimum 68 ohms in order to maintain as large a comparator gain as possible. This implies careful selection of pentodes. It was found that three out of 5 pentode tubes could be compensated by the 68 ohm equalizing potentiometer. It is therefore assumed that the percentage of usable pentodes for comparator purposes would increase if tubes were used where quality control is much more stringent.

The modified analyzer has been packaged and completely checked out. Its performance showed it to be a superior unit because of the few simple redesign features.

The total volume of the complete unit is 5″ x 7″ x 4⅜″ deep. The size of this unit could be further reduced by the use of subminiature tubes and subminiature potentiometers.

Where space and weight permit the modification of FIG. 11 would be used and the construction of FIG. 1 used only under extremes of space or weight limitation.

For purpose of illustration particular embodiments of the invention have been illustrated and described according to the best present understanding thereof. However, it will be apparent to those skilled in the art that various changes and modifications in the construction and arrangement of the parts thereof can be made without departing from the true spirit and scope of the invention.

I claim:

1. A modulation detector comprising a first and a second voltage generator, a first and a second difference amplifier, said difference amplifiers being cross connected to said voltage generators, a first and a second level slicer, said slicers being controlled by the respective difference amplifiers, a first and a second gate tube responsive respectively to said first and second slicers, said gate tubes being connected in parallel to an output circuit and an amplifier between each of said difference amplifiers and its respective slicer.

2. A modulation detector comprising a first and a second voltage generator, a first and a second difference amplifier, said difference amplifiers being cross connected to said voltage generators, a first and a second slicer, said slicers being controlled by the respective difference amplifiers, a first and a second gate tube responsive respectively to said first and second slicers, said gate tubes being connected in parallel to an output circuit.

3. A modulation detector comprising a first potential generator responsive to a first sequence of spaced samples of the amplitude of the received wave, a second potential generator responsive to a second sequence of spaced amplitude samples at suitable time intervals from said first sequence, means for periodically applying said first and second samples to the respective potential generators, an adder connected to provide the sum of the outputs of said generators, a difference amplifier providing the difference between the outputs of said generators, a comparator responsive to the sum and difference of said outputs of said generators for providing sequential control signals, a gate connected to respond to said control potentials, said gate having a threshold potential applied thereto, and a blocking oscillator controlled by said gate.

4. A modulation detecting system responsive to a first and second series of interspaced amplitude samples of the envelope of a received transmission comprising a first and second potential generator, said first generator providing a series of output potentials controlled by the amplitudes of the first series of samples, said second generator providing a series of output potentials controlled by the amplitudes of the second series of samples, an adder connected to provide the sum of outputs of said generators, means providing the difference between said output potentials, a comparator responsive to said sum and difference for providing control potentials, a gate, circuit means for applying said control potentials to said gate, a control circuit for applying read out pulses to said gate and a pulse generator controlled by the output of said gate.

5. A statistical analyzer for determining the presence or absence of modulation on a detected radiation comprising a first potential generator providing a first sequence of input potentials proportional to the height of a first sequence of samples of preselected sequential portions of the envelope of a received radiation, a second potential generator providing a second sequence of input potentials proportional to the height of a second sequence of samples of second preselected sequential portions of the envelope taken at a predetermined time relation along the envelope from said first samples, a difference amplifier responsive to the output potentials of said generators, an adder connected for obtaining the sum of said output potentials, a comparator providing sequential control potentials dependent on the sequential magnitudes of the sum and difference of said input potentials, a gate having a threshold potential applied thereto, said control potential determining the operations of said gate and a blocking oscillator responsive to the operation of said gate.

References Cited in the file of this patent

UNITED STATES PATENTS

| | | |
|---|---|---|
| 2,779,869 | Gerks | Jan. 29, 1957 |
| 2,854,191 | Raisbeck | Sept. 30, 1958 |